United States Patent
Hannan et al.

(10) Patent No.: US 11,751,178 B2
(45) Date of Patent: Sep. 5, 2023

(54) MECHANISM FOR ENVIRONMENTAL SENSING CAPABILITY PROTECTION

(71) Applicant: CommScope Technologies LLC, Hickory, NC (US)

(72) Inventors: Ariful Hannan, Sterling, VA (US); Andrew E. Beck, Ashburn, VA (US); Khalid W. Al-Mufti, Sterling, VA (US); Thomas Booker Gravely, Herndon, VA (US)

(73) Assignee: CommScope Technologies LLC, Hickory, NC (US)

( * ) Notice: Subject to any disclaimer, the term of this patent is extended or adjusted under 35 U.S.C. 154(b) by 300 days.

(21) Appl. No.: 16/454,453

(22) Filed: Jun. 27, 2019

(65) Prior Publication Data

US 2020/0059931 A1    Feb. 20, 2020

Related U.S. Application Data

(60) Provisional application No. 62/718,955, filed on Aug. 14, 2018.

(51) Int. Cl.
*H04W 72/0453* (2023.01)
*H04B 17/318* (2015.01)
*H04W 72/23* (2023.01)

(52) U.S. Cl.
CPC ...... *H04W 72/0453* (2013.01); *H04B 17/318* (2015.01); *H04W 72/23* (2023.01)

(58) Field of Classification Search
USPC .................................. 370/210; 455/63, 1
See application file for complete search history.

(56) References Cited

U.S. PATENT DOCUMENTS

2016/0198348 A1 * 7/2016 Jover .............. H04K 3/228
455/452.1
2017/0195887 A1 * 7/2017 Jovancevic ....... H04W 72/0446
(Continued)

OTHER PUBLICATIONS

Sanders et al., "Procedures for Laboratory Testing of Environmental Sensing Capability Sensor Devices" NTIA Technical Memorandum 18-527, Nov. 2017, pp. 1-36, U.S Department of Commerce.
(Continued)

*Primary Examiner* — Alpus Hsu
*Assistant Examiner* — Hooman Houshmand
(74) *Attorney, Agent, or Firm* — Fogg & Powers LLC

(57) ABSTRACT

A system for ESC protection includes a spectrum access system (SAS) configured to allocate a frequency band in the system and at least one Citizens Broadband Radio Service device (CBSD) communicatively coupled to the SAS and configured to provide wireless service to UEs. The system also includes at least one ESC communicatively coupled to the SAS and configured to detect RADAR signals from offshore RADAR devices. The SAS is configured to assign grants to the at least one CBSD such that the aggregate signal energy received at the ESC does not cross an overload threshold, as calculated by the SAS. The ESC is configured to detect an aggregate signal energy received at the ESC, and trigger, in response to the aggregate signal energy exceeding the overload threshold, an operation that suspends transmission of at least one CBSD or moves at least one CBSD to a different frequency channel.

27 Claims, 5 Drawing Sheets

(56) References Cited

U.S. PATENT DOCUMENTS

2018/0017663 A1* 1/2018 Al-Mufti ................. H04B 1/69
2019/0150134 A1* 5/2019 Kakinada ............ H04W 72/048
 370/330
2019/0335336 A1* 10/2019 Cimpu ................. H04W 16/14
2019/0394678 A1* 12/2019 Syed .................. H04L 41/0896

OTHER PUBLICATIONS

Wireless Innovation Forum, "Requirements for Commercial Operation in the U.S. 3550-3700 MHz Citizens Broadband Radio Service Band", CBRS WInnForum Standards, Jan. 16, 2018, pp. 1-77, The Software Defined Radio Forum Inc.

* cited by examiner

னCHANISM FOR ENVIRONMENTAL
MECHANISM FOR ENVIRONMENTAL SENSING CAPABILITY PROTECTION

CROSS-REFERENCE TO RELATED APPLICATIONS

This application claims the benefit of U.S. Provisional Patent Application Ser. No. 62/718,955 filed on Aug. 14, 2018, entitled "MECHANISM FOR ESC PROTECTION", the entirety of which is incorporated herein by reference.

BACKGROUND

Citizens Broadband Radio Service (CBRS) systems may utilize the 3.5 GHz band (3550 MHz to 3700 MHz) to provide wireless service (e.g., 4G, 5G, etc.) to fixed or mobile devices in a geographic area. Since the 3.5 GHz band is shared between commercial users and government users (e.g., offshore RADAR systems), various protections are implemented to prevent the CBRS system from disrupting the operation of the government users (e.g., offshore RADAR systems).

Accordingly, it may be beneficial to implement systems and methods for protecting an environmental sensing capability (ESC) from excess interference while efficiently utilizing available spectrum.

SUMMARY

A system for ESC protection includes a spectrum access system (SAS) configured to allocate a frequency band in the system and at least one Citizens Broadband Radio Service device (CBSD) communicatively coupled to the SAS and configured to provide wireless service to UEs. The system also includes at least one ESC communicatively coupled to the SAS and configured to detect RADAR signals from offshore RADAR devices. The SAS is configured to assign grants to the at least one CBSD such that the aggregate signal energy received at the ESC does not cross an overload threshold, as calculated by the SAS. The ESC is configured to detect an aggregate signal energy received at the ESC, and trigger, in response to the aggregate signal energy exceeding the overload threshold, an operation that suspends transmission of at least one CBSD or moves at least one CBSD to a different frequency channel.

DRAWINGS

Understanding that the drawings depict only exemplary configurations and are not therefore to be considered limiting in scope, the exemplary configurations will be described with additional specificity and detail through the use of the accompanying drawings, in which.

Figure 1A:
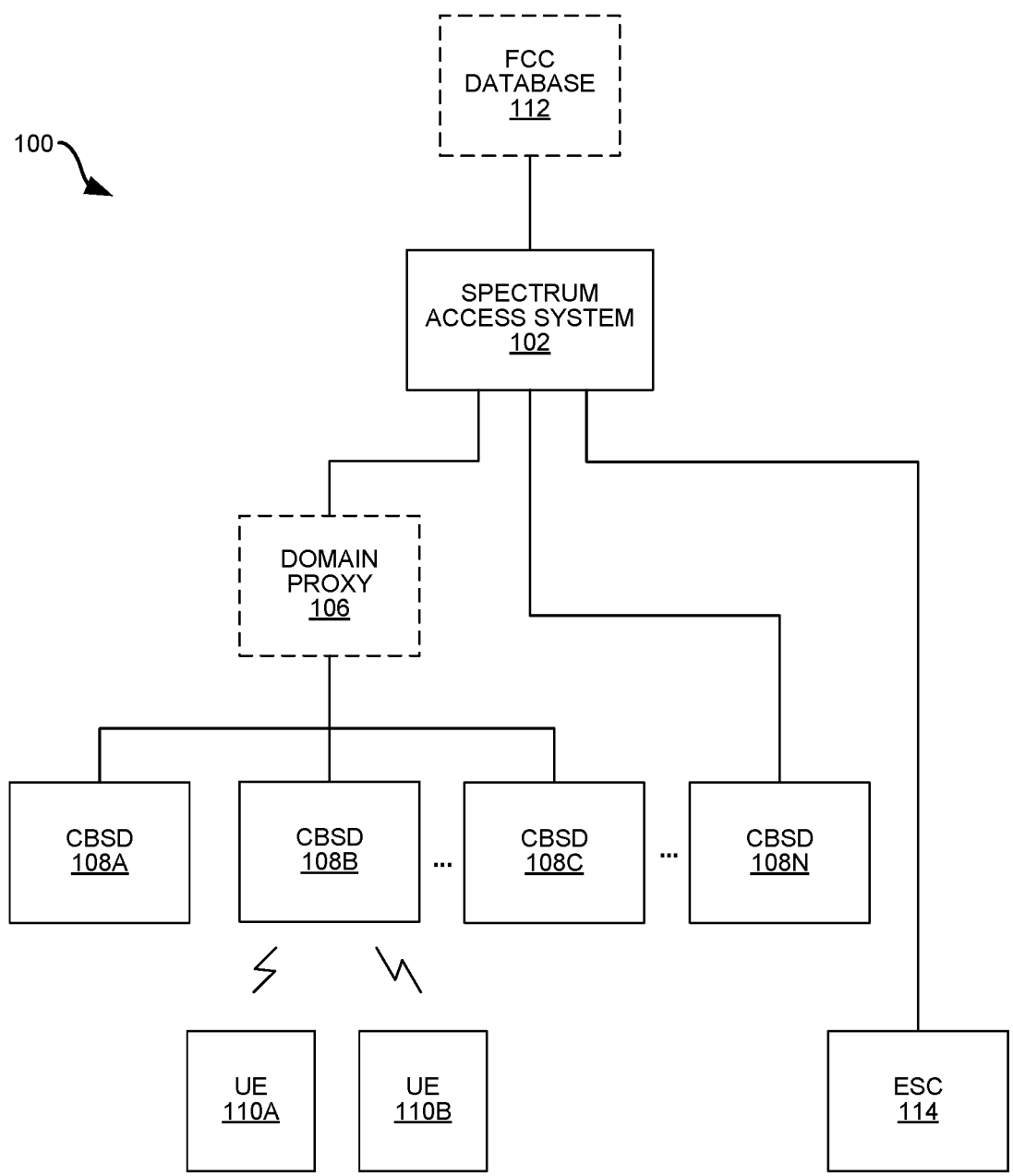
FIG. 1A is a block diagram illustrating an example system for Environmental Sensing Capability (ESC) protection.

In accordance with common practice, the various described features are not drawn to scale but are drawn to emphasize specific features relevant to the exemplary configurations.

DETAILED DESCRIPTION

A CBRS system may include a spectrum access system (SAS), one or more Citizens Broadband Radio Service devices (CBSDs), and one or more user equipment (UEs). The CBSD(s) may provide wireless service to one or more UEs, e.g., each CBSD may act as a base station. The SAS may assign spectrum (e.g., in the 3.5 GHz band) to the CBSDs in the CBRS system.

A CBRS system may also include at least one environmental sensing capability (ESC), which is a device (or a computerized method executed on a device) that detects nearby RADAR signals using one or more sensors. For example, the at least one ESC may be deployed near a shoreline to detect the presence of any RADAR signals originating from offshore RADAR devices.

Wireless Innovation Forum (WInnForum) promulgates standards for CBRS systems. Among other requirements, the WInnForum standard requires a spectrum access system (SAS) to protect the ESC sensors from CBSD transmissions (e.g., through assignment of CBSD grants) such that the mean aggregate signal received at the ESC sensor antenna port does not cross −109 dBm/MHz. Furthermore, an ESC receiver must detect a RADAR when the peak RADAR signal at the ESC receiver antenna port is more than −89 dBm/MHz, according to National Telecommunications and Information Administration (NTIA) Technical Memorandum 18-527. In other words, −89 dBm/MHz is used as a trigger for the peak RADAR signal. In this way, the WInnForum standard seeks to prevent excess interference from CBSDs from interfering with the ESC's ability to detect RADAR signals.

To implement this protection, the SAS may control the CBSD grant Effective Isotropic Radiated Power (EIRP) such that the aggregate mean (as calculated by a propagation model) does not cross −109 dBm/MHz, according to WInnForum Working Document WINNF-TS-0112 (R2-SGN-16 and R2-SGN-25).

However, this ESC protection method for ESC sensors creates a dead zone around ESC sensors that negatively impacts spectral efficiency. Specifically, CBSD transmission is severely limited close to the ESC to keep the aggregation below −109 dBm/MHz. This limitation extends across the entire set of 120 MHz from 3550-3680 MHz (beyond 3680 MHz the ESC filter provides 1 dB/MHz attenuation).

The present systems and methods may control the CBSD grant EIRP such that the aggregate mean (as calculated by a propagation model) does not cross an overload threshold ($Ov_{TH}$), e.g., −99 dBm/MHz (as opposed to −109 dBm/MHz). Furthermore, when the aggregate signal energy (including CBSD interference and possibly RADAR signal(s)) exceeds the overload threshold, the ESC may trigger the SAS to perform a move list operation, i.e., where one or more CBSDs (that are transmitting in a segment of the CBRS frequency band that exceeds the overload threshold) are required to suspend transmission or move to a different frequency channel. Compared to conventional methods of ESC protection in CBRS systems, the present systems and methods may more fully utilize the spectrum (while still protecting the ESC from excess interference).

FIG. 1A is a block diagram illustrating an example system 100 for Environmental Sensing Capability (ESC) 114 protection. The system 100 may be a Citizens Broadband Radio Service (CBRS) system that includes a spectrum access system (SAS) 102, one or more Citizens Broadband Radio Service devices (CBSDs) 108A-N, one or more items of user equipment (UEs) 110A-B, and at least one ESC 114. The CBSDs 108, UEs 110, and ESC 114 in the system 100 may be capable of transmitting and receiving in the entire 3.5 GHz band, even if they are not deployed in that manner.

Citizens Broadband Radio service (CBRS) is a tiered commercial radio service in 3.5 GHz in the U.S. Channels are allocated within and across tiers. These tiers can include, in order of priority, (1) incumbent licensees; (2) Priority Access (PA) licensees; and (3) General Authorized Access (GAA) operators. Portions of spectrum that are not continuously used by an incumbent licensee can be allocated to the secondary users—that is, PA licensees and GAA operators.

The SAS 102 may be an FCC-mandated function that assigns unlicensed spectrum in a geographical area. The SAS 102 may be implemented with one or more processors in one or more physical devices. The SAS 102 may optionally be coupled to an FCC database 112 that includes data used by the SAS 102 during spectrum allocation. The SAS 102 may limit the maximum power of CBSDs 108 to perform interference mitigation between tiers. The SAS 102 may also remove CBSD(s) 108 from a communication channel, i.e., the SAS 102 may instruct CBSD(s) 108 to suspend transmission or move to a different frequency channel. As discussed below, the SAS 102 may control the grants assigned to the CBSDs 108 in the system 100 to prevent excess interference at the ESC 114, which could prevent the ESC 114 from detecting offshore RADAR signals.

Since the CBRS band is open spectrum, it can be used by different devices operating according to different wireless protocols, e.g., CBRS devices, Wireless Internet Service Providers Association (WISPA) devices, Wi-Fi devices, etc. In order to enable coexistence between various devices (CBRS or otherwise) using CBRS spectrum in the system 100, the SAS 102 may assign the CBRS spectrum in a way that protects users from lower levels. For example, when an incumbent (Tier 1) licensee transmits, the SAS 102 may prevent lower-tiered users, such as Priority Access Licensees (PAL) and General Authorized Access (GAA) operators, from transmitting.

Each CBSD 108 may be a device that provides wireless (e.g., Long Term Evolution (LTE), 5G, etc.) service to one or more items of user equipment (UEs) 110 in a surrounding geographical area. The CBSDs 108 may alternatively be referred to as "enhanced Node Bs," "eNBs," "small cells," radio service devices," etc. In one configuration, the CBSDs 108A-C may be coupled to the SAS 102 via an optional domain proxy 106. Alternatively, a CBSD 108N may be coupled to the SAS 102 without an intervening domain proxy 106. In any case, the CBSDs 108 may be communicatively coupled to the SAS 102, e.g., using one or more Ethernet connections. The CBSDs 108 may be PAL and/or GAA users. The system 100 may include any number of CBSDs 108 that are preferably physically separated based on a variety of factors, e.g., propagation paths between CBSD 108 and UE 110, location density of UEs 110, and/or proximity to ESC(s) 114.

CBSDs 108 operating in the CBRS band may be required to register with the SAS 102 and provide their location and other details to the SAS 102. The SAS 102 may then assign a set of RF channels that the PAL and GAA users can access.

The UEs 110 may be mobile end user terminals, and may also referred to as handsets, smartphones, cell phones, access terminals, wireless communication devices, mobile devices, etc. In some configurations, the UEs 110 may be LTE UEs that are additionally certified by the CBRS Alliance. The UEs 110 may wait for authorization from a nearby CBSD 108 before transmitting in the CBRS band.

The system 100 may also include at least one ESC 114. Each ESC 114 may be a device (or a computerized method executed on a device) that uses at least one sensor to detects at least RADAR (e.g., incumbent) transmissions. For example, at least one ESC 114 may be deployed near a shoreline to detect the presence of any RADAR signals originating from offshore RADAR devices. Each ESC 114 may be implemented using one or more processors, physically located in at least one housing and executing a set of instructions stored in at least one memory.

Since the CBRS band (e.g., 3.5 GHz) is shared and since the ESC(s) 114 may be located near CBSD(s) 108, the SAS 102 may be responsible for assigning grants to the CBSDs 108 in a way that prevents the ESC 114 from experiencing excess interference (from the CBSDs 108) that would prevent the ESC 114 from detecting offshore RADAR signals. When assigning grants to the CBSDs 108, the SAS 102 may calculate interference at the ESCs 114 using a propagation model, e.g., a propagation model between a transmitter and receiver that accounts for propagation path, frequency, distance, climate, and/or other parameters relevant to the system 100. For example, the SAS 102 may assign grants to the CBSDs 108 in a way that prevents (as predicted by the propagation model) the aggregate mean interference at the ESC 114 from exceeding an overload threshold, e.g., −99 dBm/MHz.

It should be noted that an Irregular Terrain Model (ITM) model is one example of a propagation model that may be used with the present systems and methods, e.g., in the SAS 102. However, other, non-ITM propagation models may be used in other configurations.

Furthermore, the at least one ESC 114 may communicate with the SAS 102 based on the interference measured at (instead of modeled for) the ESC 114. For example, when the aggregate mean signal energy measured at a particular ESC 114 exceeds the overload threshold (e.g., −99 dBm/MHz), the ESC 114 may transmit an indication to the SAS 102 to trigger a move list operation. When the SAS 102 receives this indication, it may force one or more CBSDs 108 are required to suspend transmission or move to a different frequency channel. Optionally, the SAS 102 may also reassess grants to one or more CBSDs 108, e.g., in response to the move list operation being triggered.

In contrast to conventional ESC protection methods, the system 100 may measure an aggregate mean signal energy at the ESC 114 without distinguishing between interference from CBSDs 108 and any present RADAR signals. For example, the ESC 114 in the system 100 may preferably not perform a correlation on received signals (to determine whether the received signal includes a RADAR signal) before triggering the move list operation at the SAS 102. In other words, the ESC 114 may determine whether to trigger the move list without knowing whether the aggregate received signal includes a RADAR component.

It should be noted that the same overload threshold (e.g., −99 dBm/MHz) may preferably be used by the SAS 102 when assigning grants to the CBSDs 108 (based on calculations using a propagation model) and by the ESC 114 to trigger the move list operation (based on the received aggregate signal). However, other configurations are possible where grants are assigned to the CBSDs 108 to prevent interference at the ESC 114 from exceeding a first threshold (based on the propagation model), while a second threshold is used to trigger a move list operation (based on the aggregate mean signal energy actually received at the ESC 114).

Figure 1B:
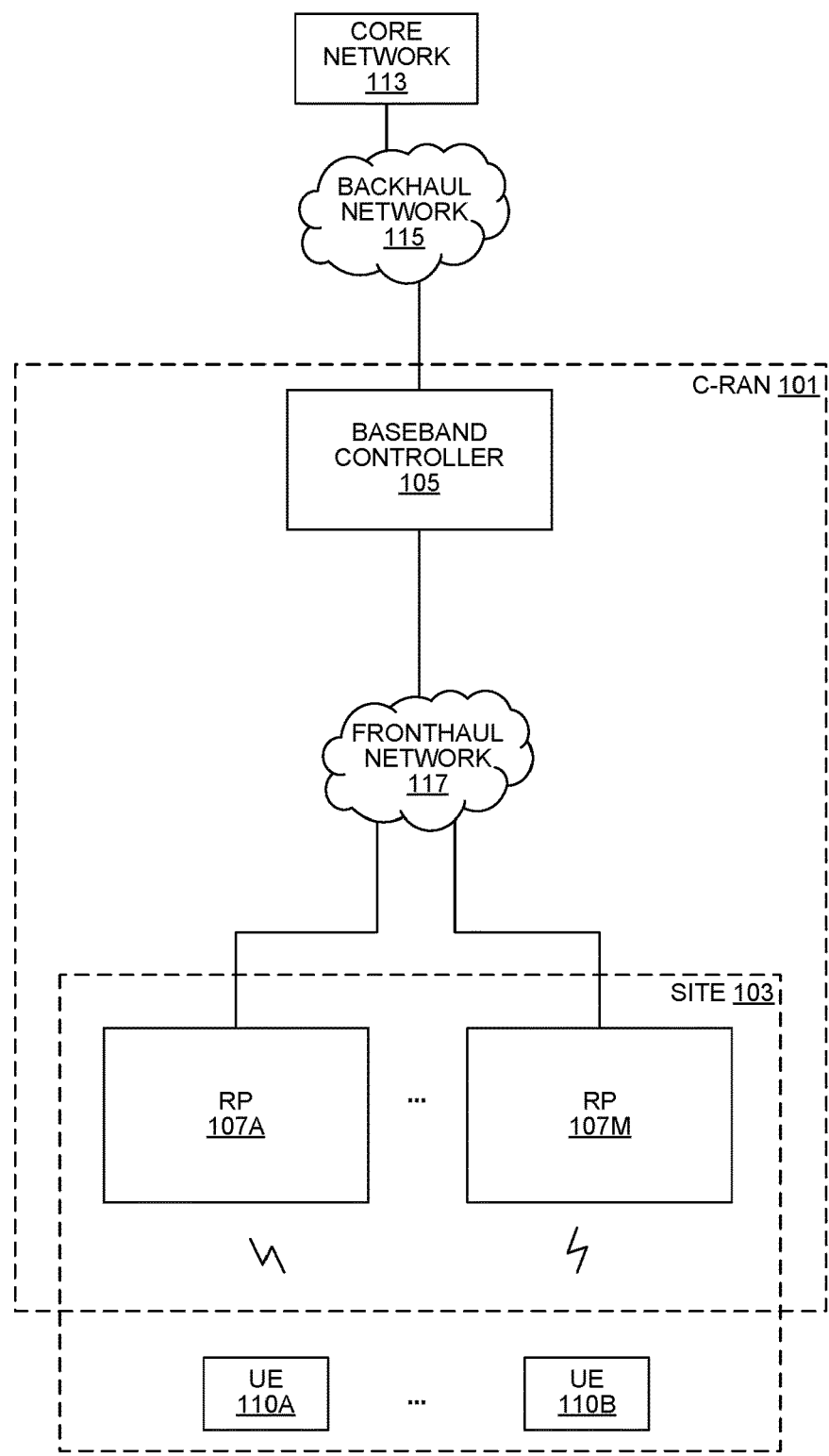
FIG. 1B is a block diagram illustrating an exemplary configuration of a system implementing a C-RAN.

FIG. 1B is a block diagram illustrating an exemplary configuration of a cloud radio access network (C-RAN) 101. The C-RAN 101 may provide wireless service/coverage and capacity for one or more wireless network operators.

In the exemplary configuration shown in FIG. 1B, the C-RAN 101 may utilize a point-to-multipoint distributed base station architecture that employs at least one (and optionally multiple) baseband unit 105 and multiple radio points (RPs) 107A-M that serve at least one cell. The C-RAN 101 may also be referred to herein as a "C-RAN system," and/or an "eNodeB" (or "eNodeB"). The baseband unit 105 is also referred to herein as a "baseband controller", "controller", "BC", or "CU". Each RP 107 may include or be coupled to at least one (e.g., two) antennas via which downlink RF signals are radiated to UEs 110A-B and via which uplink RF signals transmitted by UEs 110 are received.

It should be noted that the baseband controller 105 may or may not be located at the site 103 (with the RPs 107). For example, the baseband controller 105 may be physically located remotely from the RPs 107 (and the site 103) in a centralized bank of baseband controllers 105. Additionally, the RPs 107 are preferably physically separated from each other within the site 103, although they are each communicatively coupled to the baseband controller 105.

The RPs 107 and UEs 110 connected to (e.g., provided wireless service by) the C-RAN 101 may be located at a site 103. The site 103 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area). For example, the site 103 may be at least partially indoors, but other alternatives are possible.

Optionally, a CBSD 108 described herein may be implemented in an RP 107 and/or a baseband controller 105. In some configurations, each baseband controller 105 will utilize a maximum of one channel module (e.g., about 20 MHz worth of capacity) from an RP 107. Each channel module worth of capacity in each RP 107 may be instantiated as a separate CBSD 108 in the RP 107. Therefore, the CBSD 108 may include a module in the RP 107 (also referred to as an "RP module" portion of the CBSD 108). The RP module portion of a CBSD 108 is a logical entity that performs CBSD 108 functions associated with the physical resources for transmitting and receiving, e.g., using a respective RF module. The CBSD 108 may also be implemented as a module in the baseband controller 105 (also referred to as a "BC module" portion of the CBSD 108). The BC module portion of the CBSD 108 is a logical entity that performs CBSD 108 functions involving the SAS 102, e.g., at least a portion of the registration process between the CBSD 108 and the SAS, requesting a grant, etc. Alternatively, a CBSD 108 may be implemented only in a baseband controller 105 or only in an RP 107.

The C-RAN 101 may be coupled to a core network 113 of each wireless network operator over an appropriate backhaul network 115. For example, the Internet (or other ETHERNET network) may be used for backhaul between the C-RAN 101 and each core network 113. However, it is to be understood that the backhaul network 115 can be implemented in other ways. The backhaul network 115 may be implemented with one or more switches, routers, and/or other networking devices.

In some configurations, the C-RAN 101 may be implemented as a Long Term Evolution (LTE) radio access network providing wireless service using an LTE air interface. However, it should be noted that the present systems and methods may be used with other wireless protocols, e.g., 5G. LTE is a standard developed by 3GPP standards organization. An eNodeB may be used to provide UEs 110 with mobile access to the wireless network operator's core network 113 to enable UE 110 to wirelessly communicate data and voice (using, for example, Voice over LTE (VoLTE) technology).

Also, in an exemplary LTE configuration, each core network 113 may be implemented as an Evolved Packet Core (EPC) 113 comprising standard LTE EPC network elements such as, for example, a mobility management entity (MME) and a Serving Gateway (SGW) and, optionally, a Home eNodeB gateway (HeNodeB GW) (not shown) and a Security Gateway (SeGW) (not shown).

The baseband controller 105 and RPs 107 can be implemented so as to use an air interface that supports one or more of frequency-division duplexing (FDD) and/or time-division duplexing (TDD). Also, the baseband controller 105 and the radio points 107 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the baseband controller 105 and the radio points 107 can implement one or more of the LTE transmission modes. Moreover, the baseband controller 105 and the radio points 107 can be configured to support multiple air interfaces and/or to support multiple wireless operators.

In the exemplary configurations shown in FIG. 1B, the fronthaul network 117 that communicatively couples each baseband controller 105 to the one or more RPs 107 is implemented using a standard ETHERNET network. However, it is to be understood that the fronthaul between the baseband controller 105 and RPs 107 can be implemented in other ways. The fronthaul network 117 may be implemented with one or more switches, routers, and/or other networking devices.

Data can be fronthauled between the baseband controller 105 and RPs 107 in any suitable way (for example, using fronthaul interfaces and techniques specified in the Common Public Radio Interface (CPRI) and/or Open Base Station Architecture Initiative (OBSAI) family of specifications).

Although not shown, a management system may be communicatively coupled to the baseband controller 105 and RPs 107, for example, via the backhaul network 115 and the fronthaul network 117 (in the case of the RPs 107). The management system may send and receive management communications to and from the baseband controller 105, which in turn forwards relevant management communications to and from the RPs 107.

Figure 2:
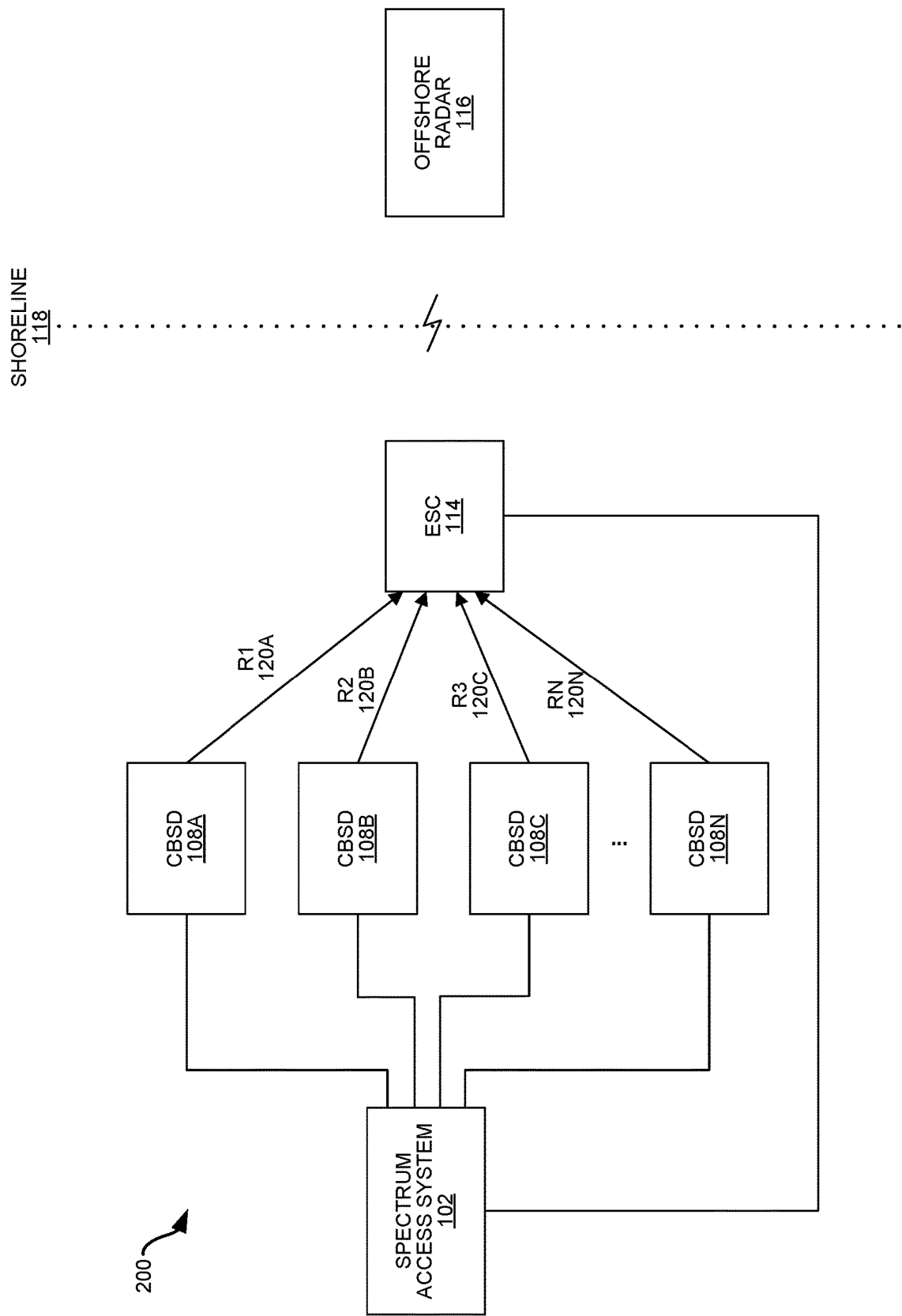
FIG. 2 is a block diagram illustrating interference in an example wireless system.

FIG. 2 is a block diagram illustrating interference in an example wireless system 200. It should be noted that the system 200 illustrated in FIG. 2 is simplified compared to the system 100 illustrated in FIG. 1A to better illustrate certain aspects, however, the system 200 may also include some or all of the devices in the system 100 of FIG. 1A.

The system 200 may include a SAS 102 that communicates with at least one CBSD 108A-N, e.g., using Ethernet connections. The system 200 may also include at least one ESC 114. The system 200 may include any number of CBSDs 108 and ESCs 114. The ESC(s) 114 may be located near a shoreline 118 to better detect signals from offshore RADAR 116 device. The offshore RADAR 116 device may be located in a dynamic protection area (DPA). A DPA is a predefined protection area (inland and/or offshore) that is activated or deactivated to protect a federal incumbent RADAR. An activated DPA must be protected from aggregate CBSD 108 interference. A deactivated DPA is not protected from CBSD 108 interference. In some configurations, one or more CBSDs 108 may be located in a DPA.

While providing wireless service to various UEs (not shown in FIG. 2), the CBSDs 108 may create excess interference that may prevent the ESC 114 from successfully detecting RADAR signals. For example, if not managed, the wireless signals from the CBSDs 108 may prevent the ESC 114 from properly receiving a signal from an offshore RADAR 116 device, e.g., a shipborne RADAR signal.

To prevent this excess interference situation, the SAS 102 may assign grants to the CBSDs 108 to prevent (as calculated by a propagation model used by the SAS 102) the aggregate signal (e.g., an RMS mean signal power) received at the ESC 114 from exceeding an overload threshold (e.g., −99 dBm/MHz). For example, the SAS 102 may control the transmission of CBSDs 108 such that the aggregate CBSD 108 signal energy (at the ESC 114 as calculated by the propagation model) does not cross the overload threshold by using the IAP calculation according to WInnForum Working Document WINNF-TS-0112, R2-SGN-16.

In FIG. 2, the mean received power (at the ESC 114) from each CBSDi 108A-N is indicated by $R_i$ 120A-N, i.e., $R_1$ 120A is the mean received power from CBSD 108A, $R_2$ 120B is the mean received power from CBSD 108B, etc. Therefore, the SAS 102 may assign grants to the CBSDs 108 so that $\Sigma_{i=1}^{N} R_i > Ov_{Th}$, e.g., as calculated by the propagation model.

To account for any anomaly and other irregularities that that the propagation model may not account for, the ESC 114 may also trigger a CBSD 108 move list operation (e.g., at the SAS 102) when the aggregate signal energy (e.g., aggregate mean interference from CBSDs 108 and/or RADAR) measured at the ESC 114 antenna port crosses the overload threshold. In some configurations, the move list operation may be triggered for segments of 10 MHz if within that 10 MHz, any portion of 1 MHz, the aggregate signal crosses the overload threshold. In such a configuration, the received signal energy may be measured for each 1 MHz bin within a larger frequency band, e.g., a 100 MHz band from 3550-3650 MHz. For example, the ESC 114 may notify the SAS 102 when, at any 1 MHz resolution across 3550-3650 MHz, $\Sigma_{i=1}^{N} R_i > Ov_{Th}$. In response, the SAS 102 may trigger the move list operation for the specified 10 MHz segment where the overload threshold crossed at any 1 MHz bin.

The move list operation may be a method of identifying CBSDs 108 that are required to suspend transmission (or move to a different frequency channel) when a RADAR is detected, e.g., as described in WInnForum Working Document WINNF-TS-112. The trigger for the move list operation when the aggregate crosses the overload threshold may be thought of as a fault condition. The SAS 102 computation through the propagation model should typically guarantee that the interference does not cross the overload threshold. In other words, the aggregate interference should only cross the overload threshold in an anomaly situation, which would be termed as an interference situation. This interference situation is similar to other cases where the IAP calculation may be used.

After the move list is triggered, the ESC 114 may be free from interference to detect radar (or at least free from excess interference that would interfere with RADAR detection). If no radar is detected, ESC 114 may notify that there are no RADARs. At that point, if all assignments resume as-is, then there is a chance that it will again cause interference more than the overload threshold. Hence, the SAS 102 may either revaluate calculation or move some assignments, i.e., in addition to the move list operation, the SAS 102 may re-assess grants to one or more CBSDs 108 following a move list operation.

Optionally, the SAS 102 may also consider one or more other kinds of information (in addition to the notification from the ESC 114) for interference assessment: (1) offshore RADAR 116 activity that is temporal with varying geographical impact at different frequencies (in some configurations RADAR activity must be detected by the CBRS system); (2) interference to fixed satellite sites (FSS) incumbents operating at fixed frequencies; (3) inland RADAR activity that is temporal and may be detected by or provided to the SAS 102; (4) interference to Part 90 Broadband (WISP) sites, which must be analyzed for specific frequencies at different grid points of the WISP coverage area; (5) interference to PAL Protection Areas which are specific frequencies and coverage regions that a provider has paid the FCC for priority access; (6) coordination with peer SASes 102 that are managing users (CBSDs 108) in the same geographic area.

The overload threshold used in the system 200 may be close to −89 dBm/MHz. For example, if aggregate signal energy is Gaussian in nature then the mean overload threshold for triggering could be −99 dBm/MHz. By placing the overload threshold at −99 dBm/MHz, the peak RADAR signal is unlikely to exceed −89 dBm/MHz.

The ESC 114 protection described herein may have advantages over other methods of ESC protection. Specifically, it may improve significant transmission margin and reduce the dead zone (surrounding the ESC 114), thereby allowing more flexible CBSD 108 deployments. For example, by using an overload threshold of −99 dBm/MHz, at least 20 dB per 10 MHz could be regained (compared to other ESC protection schemes). Furthermore, offshore RADAR 116 may be protected to at least the same level as before, and even provides additional protection when the ESC 114 observes any aggregate signal energy above the overload threshold.

Figure 3:
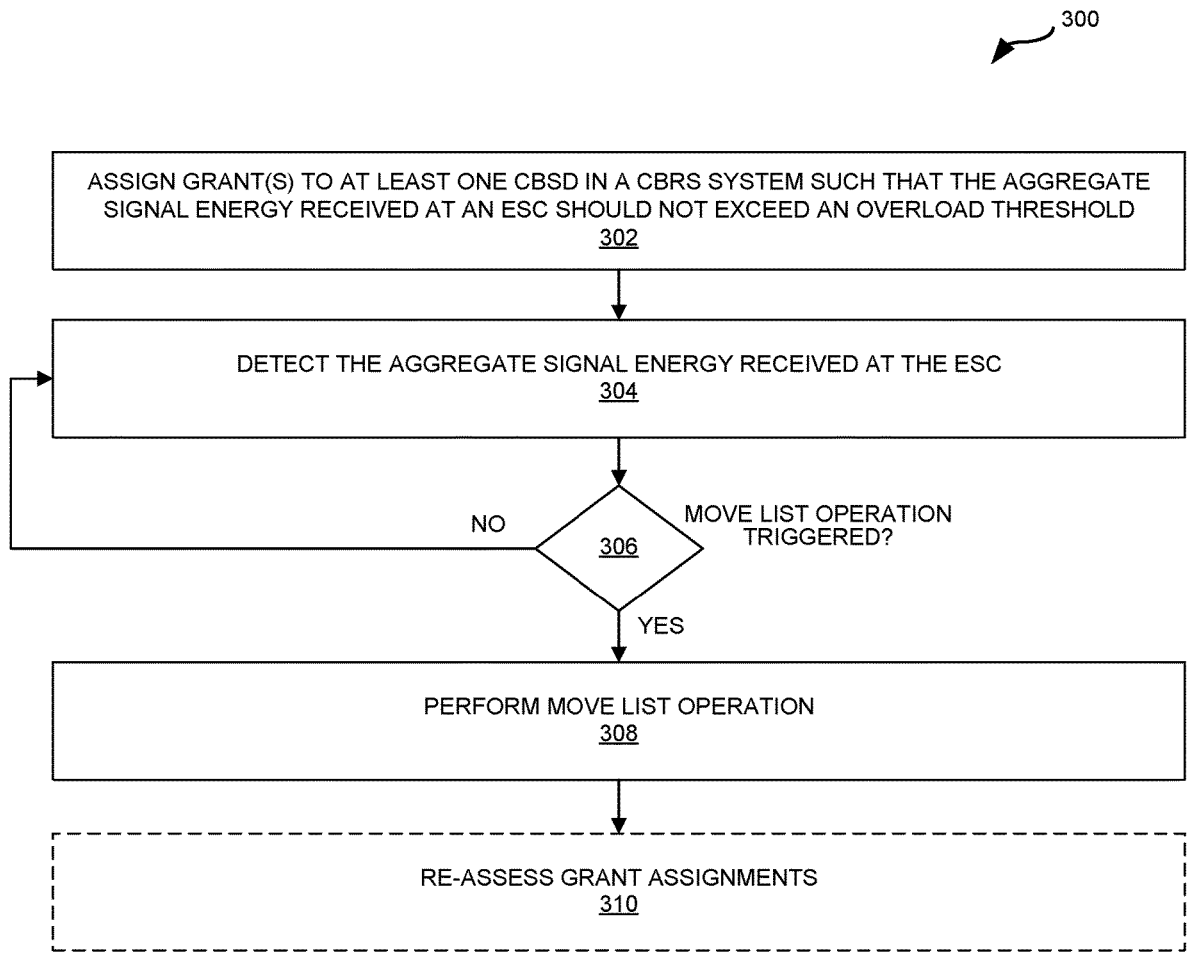
FIG. 3 is a flow diagram illustrating a method for triggering a move list operation.

FIG. 3 is a flow diagram illustrating a method 300 for triggering a move list operation. The method 300 may be performed by a combination of a SAS 102 and ESC 114, e.g., in the system 100 of FIG. 1A or the system of FIG. 2. Each of the SAS 102 and the ESC 114 may include at least one processor configured to execute instructions stored in at least one memory.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that method 300 can and typically would include such exception handling.

The at least one processor in the SAS 102 may be configured to assign 302 grant(s) to at least one CBSD 108 in the CBRS system 100, 200 such that the aggregate signal energy received at the ESC 114 should not exceed an overload threshold, e.g., −99 dBm/MHz. When assigning grants to the CBSDs 108, the SAS 102 may calculate interference at the ESCs 114 using a propagation model. For example, the SAS 102 may assign grants to the CBSDs 108 in a way that prevents, as calculated by the propagation model, the aggregate mean interference experienced at the ESC 114 from exceeding the overload threshold.

However, in order to account for rogue CBSDs 108 and other irregularities that that the propagation model may not account for, the at least one processor in the ESC 114 may be configured to detect 304 the aggregate signal energy received at the ESC 114. The aggregate signal may be a root mean square (RMS) signal power that may include interference from one or more CBSDs 108 and possibly energy from at least one RADAR signal, e.g., from an offshore RADAR 116 device.

Optionally, the aggregate signal energy may be detected (at the ESC 114) by measuring an ESC interfering signal's Power Spectral Density (PSD), or total power in a subband (e.g. a 1 MHz subband) and comparing the PSD to the overload threshold ($Ov_{TH}$) in dBm/(1 MHz). A signal processing technique known as Fast Fourier Transform (FFT) may be used to estimate the interferer's PSD in real-time. The received signal (at the ESC 114) may be digitized with sampling frequency $f_s$ and processed with an FFT of size N, such that the FFT frequency resolution allows for accurate estimation of the interferer's PSD. As an example, the sampling frequency may be set to meet Nyquist sampling rate for the ESC 114 required bandwidth (e.g. 100 Mhz) and an FFT size of 131072. In this case, the FFT resolution may be 1 KHz/FFT-Bin.

The at least one processor in the ESC 114 may also be configured to determine 306 whether the move list operation has been triggered. This may include comparing the aggregate signal energy received at the ESC 114 exceeds an overload threshold.

In the optional PSD implementation of the energy detection (step 304) described above, determining whether the move list operation has been triggered may include the at least one processor in the ESC 114 determining if the total power in 1000 contiguous frequency bins is greater than the overload threshold. An equation for the ESC 114 PSD detection criterion may be: $P\_dBm_{1\ MHz} = 10 * \log_{10} \Sigma_i^{i+1000} abs(FFT_{bin(i)})^2 \geq Ov_{Th}$, where abs( ) is the absolute value, i is the FFT bin index with range 1 to N, and $Ov_{Th}$ is a calibrated value that corresponds to ESC overload threshold (e.g. −99 dBm/1 MHz) at the input of the ESC 114 receiver.

When the move list operation has not been triggered, the at least one processor in the ESC 114 may be configured to continue detecting 304 the aggregate signal energy received at the ESC 114. When the move list operation has been triggered (i.e., in response to the ESC 114 determining that the received aggregate signal energy exceeds the overload threshold), the move list operation may be performed 308, i.e., one or more CBSDs 108 transmitting on the 10 MHz segment of frequencies (that exceeded the overload threshold) must either suspend transmissions or move to another frequency channel. The move list operation may be performed 308 by the SAS 102 instructing at least one selected CBSD 108 to suspend transmissions or move to another frequency channel.

It should be noted that the move list operation may also be used at other times, e.g., when ESC 114 detects presence of RADAR (without respect to the overload threshold). However, as described herein (e.g., in step 306), the move list operation may also be triggered when the threshold crosses $Ov_{Th}$. The move list operation (e.g., as adopted in WInnForum, R2-SGN-24 of WINNF-TS-0112) may suspend one or more CBSDs 108 or move one or more CBSDs 108 to different spectrum with the goal of bringing aggregate interference to the dynamic protection area (DPA) to −144 dBm/MHz. It should be noted that other procedures (i.e., other than those adopted in WInnForum, R2-SGN-24 of WINNF-TS-0112) may be used to suspend one or more CBSDs 108 or move one or more CBSDs 108 to different spectrum with the goal of bringing aggregate interference to the dynamic protection area (DPA) to −144 dBm/MHz.

In addition to performing 308 the move list operation, the at least one processor in the SAS 102 may also be configured to optionally re-assess 310 grant assignments. In other words, once the aggregate signal energy at the ESC 114 exceeds the overload threshold, the at least one processor in the SAS 102 may attempt to identify CBSDs 108 either from observed measurements or information available to specific SAS 102 (e.g., for its serving CBSD 108). Specifically, when the aggregate mean interference from CBSDs 108 (and possibly offshore RADAR 116 devices) at the ESC 114 antenna port crosses the overload threshold, one of at least three possible methods may be used to re-assess assignments.

In a first method, the at least one processor in the SAS 102 may be configured to immediately suspend transmission, reduce EIRP, and/or change the frequency channel for specific CBSDs 108 (by modifying/assigning new grants) to bring the aggregate interference down below the overload threshold. In the first method, the CBSDs 108 selected based on location, height, distance from ESC 114, and/or EIRP grant of the CBSDs 108.

In a second method, an additional antenna may be located on the ESC 114 to more intelligently identify a specific interfering CBSD 108 whose transmission should be suspended, EIRP reduced, and/or channel changed. For example, a second antenna can be collocated with the ESC 114 with its main-beam pointing towards the dynamic protection area (DPA) neighborhood where CBSDs 108 are located. The ESC 114 may use the second input to detect, and possibly decode due to higher SINR, the specific interfering CBSD (detecting a physical cell identifier (PCI) for LTE), and inform the SAS 102 to remove or limit the output of identified CBSD 108. By correlating the channel where the main (front side) antenna detected interference and where the back side detected a GAA/PAL channel (GAA/PAL can operate LTE, WiMAX, or any other radio interface), the ESC 114 may identify interfering CBSD 108.

In a third method, multiple additional antennas may be located on the ESC 114 to intelligently identify the specific interfering CBSD 108 whose transmission should be suspended, EIRP reduced, and/or channel changed. For example, multiple antenna can be collocated with the ESC 114 with their main beams (ESC 114 performing beamforming with the multiple antenna, with main-beams pointing towards one or more DPAs and towards DPA neighborhood), thus allowing ESC 114 to use the set of multiple antenna input to detect, and possibly decode due to higher SINR, the specific interfering CBSD 108 (detecting a physical cell identifier (PCI) for LTE), and informing the SAS 102 to remove or limit the output of identified CBSD 108.

Computer System Overview

Configurations of the present disclosure include various steps and operations, which have been described above. A variety of these steps and operations may be performed by hardware components or may be embodied in machineexecutable instructions, which may be used to cause a general-purpose or special-purpose processor programmed with the instructions to perform the steps. Alternatively, the steps may be performed by a combination of hardware, software, and/or firmware.

Figure 4:
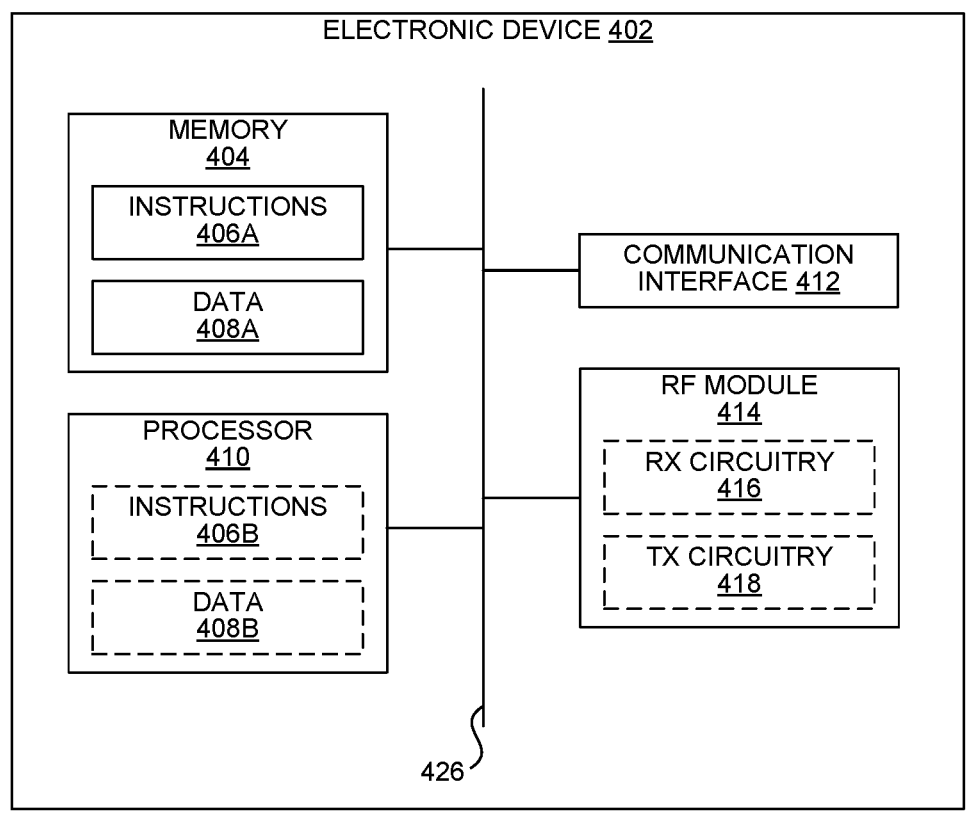
FIG. 4 is a block diagram illustrating an example of an electronic device that may utilize some configurations of the present disclosure.

As such, FIG. 4 is a block diagram illustrating an example of an electronic device that may be utilized in some configurations of the present disclosure. The illustrated components may be located within the same physical structure or in separate housings or structures. The SAS 102, CBSD 108, ESC 114, and/or UE 110 described above may utilize one or more of the electronic devices 402 described in FIG. 4. The electronic device 402 includes a processor 410. The processor 410 may be a general purpose single- or multi-chip microprocessor (e.g., an ARM), a special purpose microprocessor (e.g., a digital signal processor (DSP)), a microcontroller, a programmable gate array, a Field Programmable Gate Array (FGPA), an application specific integrated circuit (ASIC), etc. The processor 410 may be referred to as a central processing unit (CPU). Although just a single processor 410 is shown in the electronic device 402 of FIG. 4, in an alternative configuration, a combination of processors (e.g., an ARM and DSP) could be used. The processor 410 (e.g., in an ESC 114) may also perform beamforming for multiple antenna (not shown), e.g., to improve signal-to-interference-plus-noise ratio (SINR).

The electronic device 402 also includes memory 404 in electronic communication with the processor 410. That is, the processor 410 can read information from and/or write information to the memory 404. The memory 404 may be any electronic component capable of storing electronic information. The memory 404 may include a machine-readable medium (also referred to as a computer-readable medium) having stored thereon instructions that may be used to program a computer (or other electronic devices) to perform a process. The machine-readable medium may include, for example, floppy diskettes, optical disks, compact disc read-only memories (CD-ROMs), digital video discs (DVDs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. The machine-readable medium may be tangible and non-transitory.

Data 408a and instructions 406a may be stored in the memory 404. The instructions 406a may include one or more programs, routines, sub-routines, functions, procedures, etc. The instructions 406a may include a single computer-readable statement or many computer-readable statements. The instructions 406a may be executable by the processor 410 to implement one or more of the methods, functions and procedures described above. Executing the instructions 406a may involve the use of the data 408a that is stored in the memory 404. FIG. 4 shows some instructions 406b and data 408b being loaded into the processor 410 (which may come from instructions 406a and data 408a).

The electronic device 402 may also include one or more communication interfaces 412 for communicating with other electronic devices. The communication interfaces 412 may be based on wired communication technology, wireless communication technology, or both. Examples of different types of communication interfaces 412 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The electronic device 402 may also include an RF module 414 with RX circuitry 416 and transmit circuitry 418. The RX circuitry 416 may include circuitry configured to receive wireless RF signals. The transmit circuitry 418 may include circuitry configured to transmit wireless RF signals.

The various components of the electronic device 402 may be coupled together by one or more buses, which may include a power bus, a control signal bus, a status signal bus, a data bus, etc. For simplicity, the various buses are illustrated in FIG. 4 as a bus system 426. Furthermore, various other architectures and components may be utilized in connection with any electronic device described herein.

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary configurations", "in example configurations", "in some configurations", "according to some configurations", "in the configurations shown", "in other configurations", "configurations", "in examples", "examples", "in some examples", "some examples" and the like generally mean the particular feature, structure, or characteristic following the phrase is included in at least one configuration of the present disclosure, and may be included in more than one configuration of the present disclosure. In addition, such phrases do not necessarily refer to the same configurations or different configurations.

If the specification states a component or feature "may," "can," "could," or "might" be included or have a characteristic, that particular component or feature is not required to be included or have the characteristic.

The terms "responsive" or "in response to" may indicate that an action is performed completely or partially in response to another action.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The techniques introduced here may be embodied as special-purpose hardware (such as circuitry), as programmable circuitry appropriately programmed with software and/or firmware, or as a combination of special-purpose and programmable circuitry. Hence, configurations may include a machine-readable medium (also referred to as a computer-readable medium) having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. The machine-readable medium may be tangible and non-transitory.

In conclusion, the present disclosure provides novel systems, methods, and arrangements for ESC protection. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a system for Environmental Sensing Capability (ESC) protection, comprising: a spectrum access system (SAS) configured to allocate a frequency band in the system; at least one Citizens Broadband Radio Service device (CBSD) communicatively coupled to the SAS and configured to provide wireless service to user equipment (UEs); and at least one ESC communicatively coupled to the SAS and configured to detect RADAR signals from offshore RADAR devices; wherein the SAS is configured to assign grants to the at least one CBSD such that the aggregate signal energy received at the ESC does not cross an overload threshold, as calculated by the SAS; wherein the ESC is configured to detect an aggregate signal energy received at the ESC, and trigger, in response to the aggregate signal energy exceeding the overload threshold, an operation that suspends transmission of at least one CBSD or moves at least one CBSD to a different frequency channel.

Example 2 includes the system of Example 1, wherein when the operation has been triggered, one or more CBSDs, which are transmitting on a 10 MHz segment of frequencies that exceeded the overload threshold, must either suspend transmissions or move to another frequency channel.

Example 3 includes the system of Example 2, wherein, in response to the operation being triggered, the SAS is further configured to re-assess the grants to the at least one CBSD in response to the operation being triggered.

Example 4 includes the system of Example 3, wherein, for at least one selected CBSD, the SAS is configured to suspend transmission, reduce the Effective Isotropic Radiated Power (EIRP), change the frequency channel, or some combination, to bring the aggregate signal energy below the overload threshold.

Example 5 includes the system of Example 4, wherein the at least one selected CBSD is selected based on one or more of the following: location of the at least one selected CBSD, height of the at least one selected CBSD, distance of the at least one selected CBSD from the ESC, and EIRP grant of the at least one selected CBSD.

Example 6 includes the system of any of Examples 4-5, wherein the ESC is further configured to use a front-side antenna pointing to a dynamic protection area (DPA) and a back-side antenna pointing to the at least one CBSD, wherein the ESC is further configured to correlate a channel where the front-side antenna detects RADAR signal and the back-side antenna a GAA/PAL channel to identify an interfering CBSD.

Example 7 includes the system of any of Examples 4-6, wherein the ESC is further configured to use multiple antenna collocated with the ESC, wherein main beams of the multiple antenna point towards one or more dynamic protection areas (DPAs), and DPA neighborhood, wherein the ESC is further configured to perform beamforming with the multiple antenna in order to detect one or more interfering CBSDs.

Example 8 includes the system of any of Examples 1-7, wherein the overload threshold is −99 dBm/MHz.

Example 9 includes the system of any of Examples 1-8, wherein the ESC is further configured to detect an aggregate signal energy received at the ESC by measuring a total power per frequency segment and comparing the total power in each frequency segment to the overload threshold in dBm.

Example 10 includes the system of Example 9, wherein a Fast Fourier Transform (FFT) is used to estimate the total power per frequency segment.

Example 11 includes the system of any of Examples 9-10, wherein the frequency segment is 1 MHz.

Example 12 includes the system of any of Examples 10-11, wherein the frequency segment is 1 MHz.

Example 13 includes the system of any of Examples 1-12, wherein the SAS uses an Irregular Terrain Model (ITM) or other propagation model to calculate the aggregate signal energy received at the ESC.

Example 14 includes a method for computing statistics for Environmental Sensing Capability (ESC) protection, comprising: assigning a grant to each of at least one Citizens Broadband Radio Service device (CBSD) such that the aggregate signal energy received at the ESC does not cross an overload threshold, as calculated by the SAS; detecting the aggregate signal energy received at the ESC; triggering, in response to the aggregate signal energy exceeding the overload threshold, an operation that suspends transmission of at least one CBSD or moves the at least one CBSD to a different frequency channel; and performing the operation when the operation is triggered.

Example 15 includes the method of Example 14, wherein when the operation has been triggered, one or more CBSDs, which are transmitting on a 10 MHz segment of frequencies that exceeded the overload threshold, must either suspend transmissions or move to another frequency channel.

Example 16 includes the method of Example 15, further comprising, in response to the operation being triggered, re-assessing the grants to the at least one CBSD in response to the operation being triggered.

Example 17 includes the method of Example 16, further comprising suspending transmission, reducing the Effective Isotropic Radiated Power (EIRP), or changing the frequency channel for the at least one selected CBSD to bring the aggregate signal energy below the overload threshold.

Example 18 includes the method of Example 17, further comprising selecting the at least one selected CBSD based on one or more of the following: location of the at least one selected CBSD, height of the at least one selected CBSD, distance of the at least one selected CBSD from the ESC, and EIRP grant of the at least one selected CBSD.

Example 19 includes the method of any of Examples 17-18, further comprising: using a front-side antenna pointing to a dynamic protection area (DPA) and a back-side antenna pointing to the at least one CBSD; and correlating a channel where the front-side antenna detects RADAR signal and the back-side antenna GAA/PAL channels to identify an interfering CBSD.

Example 20 includes the method of any of Examples 17-19, further comprising: using multiple antenna collocated with the ESC, performing beamforming with the multiple antenna in order to detect one or more interfering CBSDs, wherein main beams of the multiple antenna point towards one or more dynamic protection areas (DPAs) and DPA neighborhoods.

Example 21 includes the method of any of Examples 14-20, wherein the overload threshold is −99 dBm/MHz.

Example 22 includes the method of any of Examples 14-21, wherein the detecting the aggregate signal energy received at the ESC comprises: measuring a total power per frequency segment; and comparing the total power in each frequency segment to the overload threshold in dBm.

Example 23 includes the method of Example 22, further comprising using a Fast Fourier Transform (FFT) to estimate the total power per frequency segment.

Example 24 includes the method of any of Examples 22-23, wherein the frequency segment is 1 MHz.

Example 25 includes the method of any of Examples 23-24, wherein the frequency segment is 1 MHz.

Example 26 includes the method of any of Examples 14-25, wherein the SAS uses an Irregular Terrain Model (ITM) or other propagation model to calculate the aggregate signal energy received at the ESC.

The invention claimed is:

1. A system for protecting an Environmental Sensing Capability (ESC), comprising:
   a spectrum access system (SAS) configured to allocate a frequency band in the system;
   at least one Citizens Broadband Radio Service device (CBSD) communicatively coupled to the SAS via at least one Ethernet connection and configured to provide wireless service to user equipment (UEs); and
   the ESC communicatively coupled to the SAS and configured to detect RADAR signals from offshore RADAR devices;
   wherein the SAS is configured to assign grants to the at least one CBSD such that an aggregate signal energy received at the ESC does not cross an overload threshold, as calculated by the SAS;
   wherein the aggregate signal energy includes energy received at the ESC from any interference from the at least one CBSD and RADAR signals, if present;
   wherein the aggregate signal energy is an aggregate mean signal energy of an aggregate signal, wherein the aggregate signal is a root mean square signal power that includes interference from the at least one CBSD and energy from at least one of the RADAR signals;
   wherein the ESC is configured to detect the aggregate signal energy received at the ESC, and trigger, in response to the aggregate signal energy exceeding the overload threshold, an operation that suspends transmission of one or more CBSDs or moves the one or more CBSDs to a different frequency channel.

2. The system of claim 1, wherein when the operation has been triggered, the one or more CBSDs, which are transmitting on a 10 MHz segment of frequencies that exceeded the overload threshold, must either suspend transmissions or move to another frequency channel.

3. The system of claim 2, wherein, in response to the operation being triggered, the SAS is further configured to re-assess the grants to the at least one CBSD in response to the operation being triggered.

4. The system of claim 3, wherein, for at least one selected CBSD, the SAS is configured to suspend transmission, reduce Effective Isotropic Radiated Power (EIRP), change the frequency channel, or some combination, to bring the aggregate signal energy below the overload threshold.

5. The system of claim 4, wherein the at least one selected CBSD is selected based on one or more of the following: location of the at least one selected CBSD, height of the at least one selected CBSD, distance of the at least one selected CBSD from the ESC, and EIRP grant of the at least one selected CBSD.

6. The system of claim 4, wherein the ESC is further configured to use a front-side antenna pointing to a dynamic protection area (DPA) and a back-side antenna pointing to the at least one CBSD, wherein the ESC is further configured to correlate a channel where the front-side antenna detects RADAR signal and the back-side antenna detects a General Authorized Access (GAA) or Priority Access Licensees (PAL) channel to identify an interfering CBSD.

7. The system of claim 4, wherein the ESC is further configured to use multiple antennas collocated with the ESC, wherein main beams of the multiple antennas point towards one or more dynamic protection areas (DPAs), and DPA neighborhood, wherein the ESC is further configured to perform beamforming with the multiple antennas in order to detect one or more interfering CBSDs.

8. The system of claim 1, wherein the overload threshold is −99 dBm/MHz.

9. The system of claim 1, wherein the ESC is further configured to detect the aggregate signal energy received at the ESC by measuring a total power per frequency segment and comparing the total power per frequency segment to the overload threshold in dBm.

10. The system of claim 9, wherein a Fast Fourier Transform (FFT) is used to estimate the total power per frequency segment.

11. The system of claim 9, wherein each frequency segment is 1 MHz.

12. The system of claim 10, wherein each frequency segment is 1 MHz.

13. The system of claim 1, wherein the SAS uses an Irregular Terrain Model (ITM) or other propagation model to calculate the aggregate signal energy received at the ESC.

14. The system of claim 1, wherein the operation suspends transmission of at least one CBSD or moves the one or more CBSDs to the different frequency channel based on a cell identifier of an interfering CBSD.

15. A method for computing statistics for protecting an Environmental Sensing Capability (ESC), comprising:
assigning a grant to each of at least one Citizens Broadband Radio Service device (CBSD) such that an aggregate signal energy received at the ESC does not cross an overload threshold, as calculated by a spectrum access system (SAS), wherein the at least one CBSD communicates with the SAS via at least one Ethernet connection;
detecting the aggregate signal energy received at the ESC;
wherein the aggregate signal energy includes energy received at the ESC from any interference from the at least one CBSD and RADAR signals, if present;
wherein the aggregate signal energy is an aggregate mean signal energy of an aggregate signal, wherein the aggregate signal is a root mean square signal power that includes interference from the at least one CBSD and energy from at least one of the RADAR signals;
triggering, in response to the aggregate signal energy exceeding the overload threshold, an operation that suspends transmission of one or more CBSDs or moves at least the one or more CBSDs to a different frequency channel; and
performing the operation when the operation is triggered.

16. The method of claim 15, wherein when the operation has been triggered, the one or more CBSDs, which are transmitting on a 10 MHz segment of frequencies that exceeded the overload threshold, must either suspend transmissions or move to another frequency channel.

17. The method of claim 16, further comprising, in response to the operation being triggered, re-assessing the grants to the at least one CBSD in response to the operation being triggered.

18. The method of claim 17, further comprising suspending transmission, reducing Effective Isotropic Radiated Power (EIRP), or changing the frequency channel for at least one selected CBSD to bring the aggregate signal energy below the overload threshold.

19. The method of claim 18, further comprising selecting the at least one selected CBSD based on one or more of the following: location of the at least one selected CBSD, height of the at least one selected CBSD, distance of the at least one selected CBSD from the ESC, and EIRP grant of the at least one selected CBSD.

20. The method of claim 18, further comprising:
using a front-side antenna pointing to a dynamic protection area (DPA) and a back-side antenna pointing to the at least one CBSD; and
correlating a channel where the front-side antenna detects RADAR signal and the back-side antenna detects a General Authorized Access (GAA) or Priority Access Licensees (PAL) channels to identify an interfering CBSD.

21. The method of claim 18, further comprising:
using multiple antennas collocated with the ESC, performing beamforming with the multiple antennas in order to detect one or more interfering CBSDs, wherein main beams of the multiple antennas point towards one or more dynamic protection areas (DPAs) and DPA neighborhoods.

22. The method of claim 15, wherein the overload threshold is −99 dBm/MHz.

23. The method of claim 15, wherein the detecting the aggregate signal energy received at the ESC comprises:
measuring a total power per frequency segment; and
comparing the total power per frequency segment to the overload threshold in dBm.

24. The method of claim 23, further comprising using a Fast Fourier Transform (FFT) to estimate the total power per frequency segment.

25. The method of claim 23, wherein each frequency segment is 1 MHz.

26. The method of claim 24, wherein each frequency segment is 1 MHz.

27. The method of claim 15, wherein the SAS uses an Irregular Terrain Model (ITM) or other propagation model to calculate the aggregate signal energy received at the ESC.

* * * * *